(12) United States Patent
Fang et al.

(10) Patent No.: US 12,722,439 B2
(45) Date of Patent: Sep. 1, 2026

(54) ADAPTIVE DAMPING NONLINEAR SPRING-VARIABLE DAMPING SYSTEM AND MOBILE PLATFORM SYSTEM

(71) Applicants: SOUTH CHINA UNIVERSITY OF TECHNOLOGY, Guangzhou City (CN); TONGJI UNIVERSITY, Shanghai (CN)

(72) Inventors: Yingguang Fang, Guangzhou (CN); Renguo Gu, Guangzhou (CN); Hehua Zhu, Shanghai (CN); Wei Wu, Shanghai (CN); Xiaobin Ding, Guangzhou (CN); Junsheng Chen, Guangzhou (CN)

(73) Assignees: SOUTH CHINA UNIVERSITY OF TECHNOLOGY, Guangzhou City (CN); TONGJI UNIVERSITY, Shanghai (CN)

( * ) Notice: Subject to any disclaimer, the term of this patent is extended or adjusted under 35 U.S.C. 154(b) by 558 days.

(21) Appl. No.: 18/349,993

(22) Filed: Jul. 11, 2023

(65) Prior Publication Data

US 2023/0347702 A1 Nov. 2, 2023

Related U.S. Application Data

(63) Continuation-in-part of application No. PCT/CN2021/122043, filed on Sep. 30, 2021.

(30) Foreign Application Priority Data

Apr. 7, 2021 (CN) ........................ 202110369940.8

(51) Int. Cl.
*B60G 17/0165* (2006.01)
*B60G 3/20* (2006.01)
(Continued)

(52) U.S. Cl.
CPC .......... *B60G 17/0165* (2013.01); *B60G 3/20* (2013.01); *B60G 15/06* (2013.01);
(Continued)

(58) Field of Classification Search
CPC .. B60G 17/0165; B60G 17/0152–0157; B60G 17/02–08; B60G 17/019–01941;
(Continued)

(56) References Cited

U.S. PATENT DOCUMENTS 4,744,444 A 5/1988 Gillingham

FOREIGN PATENT DOCUMENTS

CN 201973160 9/2011
CN 109972696 7/2019
(Continued)

*Primary Examiner* — David R Morris
(74) *Attorney, Agent, or Firm* — JMB Davis Ben-David

(57) ABSTRACT

Described herein is an adaptive damping nonlinear spring-variable damping system and a mobile platform system, with the nonlinear spring-variable damping system applied to the mobile platform. The nonlinear spring-variable damping system comprising: an oil cylinder accommodating damping oil; a piston, accommodated in the oil cylinder and movable along the oil cylinder to make the damping oil flow; at least one connecting rod, connected to the piston; at least one spring, whose deformation process is constrained by the connecting rod; and a damping adaptive adjustment device, configured to be able to adaptively change the flow resistance of the damping oil according to the vibration of the mobile platform, so as to control the system damping; when the mobile platform vibrates, the connecting rod and the spring can subject the piston to a nonlinear spring force.

15 Claims, 12 Drawing Sheets

(51) Int. Cl.

| | |
|---|---|
| ***B60G 15/06*** | (2006.01) |
| ***B60G 17/015*** | (2006.01) |
| ***B60G 17/02*** | (2006.01) |
| ***B60G 17/08*** | (2006.01) |
| ***F16F 9/46*** | (2006.01) |

(52) U.S. Cl.
CPC ......... *B60G 17/0152* (2013.01); *B60G 17/02* (2013.01); *B60G 17/08* (2013.01); *F16F 9/467* (2013.01); *B60G 2202/322* (2013.01); *B60G 2202/42* (2013.01); *B60G 2204/62* (2013.01); *B60G 2206/41* (2013.01); *B60G 2206/42* (2013.01); *B60G 2500/104* (2013.01); *B60G 2500/22* (2013.01); *B60G 2600/182* (2013.01); *B60G 2600/21* (2013.01); *B60G 2800/162* (2013.01)

(58) Field of Classification Search
CPC ........ B60G 3/20–265; B60G 15/06–07; B60G 2204/62; B60G 2206/41–428; B60G 2500/10–116; B60G 2500/22; B60G 2600/182; B60G 2600/21; B60G 2800/162; B60G 2400/821; B60G 2400/90–98; B60G 2202/322; B60G 2202/42–424; F16F 9/467
See application file for complete search history.

(56) References Cited

FOREIGN PATENT DOCUMENTS

| | | | |
|---|---|---|---|
| CN | 110486410 | 11/2019 | |
| CN | 110594333 | 12/2019 | |
| CN | 110857718 | 3/2020 | |
| CN | 111591887 | 8/2020 | |
| CN | 111946767 | 11/2020 | |
| CN | 113175492 | 7/2021 | |
| JP | 2005199990 | 7/2005 | |
| JP | 2010100223 | 5/2010 | |
| JP | 2012052594 | 3/2012 | |
| RU | 208350 U1 * | 12/2021 | ............ B60G 21/06 |

* cited by examiner

ADAPTIVE DAMPING NONLINEAR SPRING-VARIABLE DAMPING SYSTEM AND MOBILE PLATFORM SYSTEM

CROSS REFERENCES TO RELATED APPLICATIONS

This is a Continuation in Part (CIP) of International Application No. PCT/CN2021/122043 filed Sep. 30, 2021; which in turn claims the benefit of Chinese Patent Application No. 202110369940.8 filed on Apr. 7, 2021.

FIELD OF THE INVENTION

The present invention relates to an adaptive damping nonlinear spring-variable damping system and a mobile platform system.

BACKGROUND OF THE INVENTION

While moving on a structural surface, a mobile detection platform will produce vibration when moving over an uneven portion. The vibration will have a significant impact on the smoothness and stability of the mobile detection platform, which will in turn affect the safety of the detection probe and the stability and accuracy of the data acquisition. Therefore, the mobile detection platform must be equipped with a damping system to reduce the impact load on the mobile platform, improve the grounding of the rollers, restrain the jump of the mobile platform, and improve the smoothness and stability of the mobile platform, thereby ensuring the safe and effective operation of the detection equipment.

The characteristics of the spring and damper used in a traditional passive damping system are unchangeable, that is, the stiffness and damping of the traditional passive damping system are immutable; and the traditional passive damping system is widely used because of its simple structure, reliable performance, low cost, and no need for additional energy. However, according to the random vibration theory, the traditional passive damping system can only achieve the optimal damping effect in a specific structural surface state and at a specific speed, and it is difficult to adapt to different structural surfaces and usage conditions. Therefore, the passive damping system is not suitable for the mobile detection platforms that need to perform detection on different structural surfaces and under different conditions.

An active suspension damping system requires complex sensors, and actuators of electronic control equipment, and demands not only high-precision hydraulic servo devices but also large external drive power, resulting in high cost, complex structure, and low reliability; therefore, it is mainly used in racing cars at present.

Currently, a semi-active suspension damping system composed of a linear spring and a damper with a variable damping coefficient is mainly used in automobiles, having better performance than the passive damping suspension, simple structure, no need for force source, small energy loss, and much lower cost than the active suspension. However, it can only adapt to different roads and driving conditions by changing the damping characteristics of the damper, with its damping performance needing to be further optimized.

SUMMARY

A first object of the present invention is to provide an adaptive damping nonlinear spring-variable damping system that is applied to a mobile platform, aiming to improve the smoothness and stability of the mobile platform in motion.

A second object of the present invention is to provide a mobile platform system, aiming to improve the smoothness and stability of the mobile platform in motion.

For the first object of the present invention, the present invention adopts the following technical solution:

An adaptive damping nonlinear spring-variable damping system, applied to a mobile platform, is provided, comprising:

- an oil cylinder accommodating damping oil;
- a piston, accommodated in the oil cylinder and movable along the oil cylinder to make the damping oil flow;
- at least one connecting rod, connected to the piston;
- at least one spring, whose deformation process is constrained by the connecting rod; and
- a damping adaptive adjustment device, configured to be able to adaptively change the flow resistance of the damping oil according to the vibration of the mobile platform, so as to control the system damping;
- wherein, when the mobile platform vibrates, the connecting rod and the spring are capable of subjecting the piston to a nonlinear spring force.

Furthermore, the piston can move in a first direction along the oil cylinder; at least one of the springs is arranged along a second direction in a spring cylinder, which is fixed to the mobile platform; the spring cylinder is further provided inside with at least one slider that can move in the second direction along the spring cylinder, one end of the spring being connected to the slider; and one end of the connecting rod is connected to the slider, and the other end to the piston.

Furthermore, the first direction is perpendicular to the second direction; and the elongation of the spring and the displacement of the piston satisfy the following constraint:

$$(x_0+u_x)^2+(y_0+u_y)^2=l^2$$

wherein a coordinate system (o, x, y) is defined, in which the origin is the intersection of the central axis of the piston and the central axis of the slider, $x_0$ is the coordinate value of the slider in its initial equilibrium position, $y_0$ is the coordinate value of the piston in its initial equilibrium position, $u_x$ is the displacement of the slider relative to its initial equilibrium position (i.e. the elongation of the spring), $u_y$ is the displacement of the piston relative to its initial equilibrium position, and l is the length of the connecting rod;

the magnitude of the nonlinear spring force in the first direction satisfies the following formula:

$$k_y u_y\left[1+\beta_0 u_y+\beta_1 u_y^2\right]$$

where $$k_y=2k_x y_0^2/x_0^2,\ \beta_0=2l^2/y_0x_0^2$$

and $$\beta_1=\left(3y_0^2+l^2\right)l^2/y_0^2x_0^4,$$

is the spring coefficient of the spring.

Furthermore, the spring cylinder has two accommodation cavities extending in the second direction, each of the accommodation cavities accommodating one of the springs and one of the sliders connected to the spring; and each of the sliders is connected to one of the connecting rods, with the two connecting rods connected to the piston at the same time;

wherein, when the two sliders are in the initial equilibrium position, both the two sliders and the two connecting rods are symmetrical about the central axis of the piston.

Furthermore, the damping adaptive adjustment device comprises the following components:

a power sensor for detecting the vibration of the mobile platform;

a micro-control unit, connected in communication with the power sensor to receive vibration information of the mobile platform from the power sensor;

a drive member, connected in communication with the micro-control unit; and a variable damping adjuster, arranged in the oil cylinder and connected to the drive member;

wherein the micro-control unit is configured to be able to control the drive member according to a predetermined control target based on the vibration information, so that the variable damping adjuster can change the circulating flow resistance of the damping oil under the action of the drive member.

Furthermore, the variable damping adjuster has at least one damping hole, through which the damping oil flows in circulation; the damping hole, having a fully open position and a fully closed position, is configured to be switchable between the fully open position and the fully closed position under the action of the drive member.

Furthermore, the variable damping adjuster comprises a first damping disc and a second damping disc that are stacked together, the second damping disc being connected to the drive member and able to be driven by the drive member to rotate relative to the first damping disc; and the first damping disc has at least one first hole, and the second damping disc has at least one second hole corresponding to the first hole, the first and second holes composing the damping holes;

wherein the drive member can change the rotation angle of the second damping disc, thereby changing the angle of the second hole, so that the damping hole can be switched between the fully open position and the fully closed position.

Furthermore, the damping adaptive adjustment device further comprises the following components:

a charge amplifier, connected in communication with the power sensor; and an analog-to-digital converter, connected in communication with the charge amplifier for receiving an amplified signal from the charge amplifier.

For the second object of the present invention, the present invention adopts the following technical solution:

A mobile platform system is provided, comprising:

a mobile platform; and the adaptive damping nonlinear spring-variable damping system arranged on the mobile platform.

Furthermore, the mobile platform is provided with a detection probe.

The present invention has the following beneficial effects: In one aspect, the nonlinear spring-variable damping system makes the piston receive a nonlinear spring force in the first direction, so that a good corresponding relationship is formed between the force on the piston and the vibration of the mobile platform; in the other aspect, the system can adaptively change the flow resistance of the damping oil according to the vibration of the mobile platform, so as to perform the negative feedback closed-loop control on the system damping. Due to both the aspects, the system can become a good equivalent damping system for the vertical vibration of the mobile platform. The amplitude of the nonlinear spring-variable damping system, compared with the linear spring-damping system, is greatly suppressed.

BRIEF DESCRIPTION OF THE FIGURES

FIG. 6A is a schematic diagram of a first damping disc according to an example of the present invention; FIG. 6B is a schematic diagram of a second damping disc according to an example of the present invention; FIG. 6C is a schematic diagram showing the angle of the first damping disc; FIGS. 6D and 6E are schematic diagrams showing the angle of the second damping disc; FIG. 6F is a schematic diagram of a damping hole in the fully open position, where the hatched area represents the size of the damping hole; FIG. 6G is a schematic diagram of the damping hole in a position between the fully open position and the fully closed position, where the hatched area represents the size of the damping hole; FIG. 6H is a schematic diagram of the damping hole in the fully closed position;

FIG. 7A is a schematic sectional view of a variable damping adjuster when the damping hole is in the fully open position; FIG. 7B is a schematic sectional view of the variable damping adjuster when the damping hole is in a position between the fully open position and the fully closed position; FIG. 7C is a schematic sectional view of the variable damping adjuster when the damping hole is in the fully closed position;

Description of reference numbers: 100. Mobile platform system; 200. Nonlinear spring-variable damping system; 300. Damping adaptive adjustment device; 1. Mobile platform; 2. Detection probe; 3. Structural surface; 4. Roller; 5.

Damping oil; 6. Oil cylinder; 61. Cavity; 62. Leg; 63. First space; 64. Second space; 65. First wall; 66. Second wall; 67. Accommodation space; 7. Piston; 8. Connecting rod; 9. Spring; 10. First sealing ring; 11. Oil tube; 12. Spring cylinder; 121. Accommodation cavity; 13. Slider; 14. Power sensor; 15. Charge amplifier; 16. Analog-to-digital converter; 17. Micro-control unit; 18. Drive member; 181. Body; 182. Drive portion; 183. Third sealing ring; 19. Variable damping adjuster; 20. Damping hole; 21. First damping disc; 211. First hole; 22. Second damping disc; 221. Second hole; 23. Second sealing ring; 24. Spring; 30. Central axis of detection probe; 40. Central axis of piston; 50. Central axis of slider; k. Equivalent nonlinear spring; η. Variable damper; m. Equivalent mass of system.

DETAILED DESCRIPTION

In order to facilitate better understanding of the objects, structures, features and effects of the present invention, the present invention will now be further described with reference to the accompanying drawings and specific embodiments. It shall be noted that the features shown in the figures are not necessarily drawn to scale. Besides, the described examples are some, but not all, of the examples of the present invention. All the other examples obtained by those of ordinary skill in the art based on the examples of the present invention without creative efforts shall fall within the protection scope of the present invention.

Unless otherwise defined, technical or scientific terms used in this disclosure shall have the ordinary meaning as understood by one of ordinary skill in the art to which this disclosure belongs. As used in this disclosure, "first", "second" and other similar words do not denote any order, quantity or importance, but are merely used to distinguish various components. Expressions like "connected to" or "connected with" are not limited to physical or mechanical connections, but may include electrical connections, whether direct or indirect. "Up", "down", "left", "right", "front", "rear" and other similar words are only used to indicate a relative positional relationship; when the absolute position of the described object changes, the relative positional relationship may also change correspondingly. In addition, "plurality" means two or more in the description of the present invention, unless otherwise specified.

Figure 1:
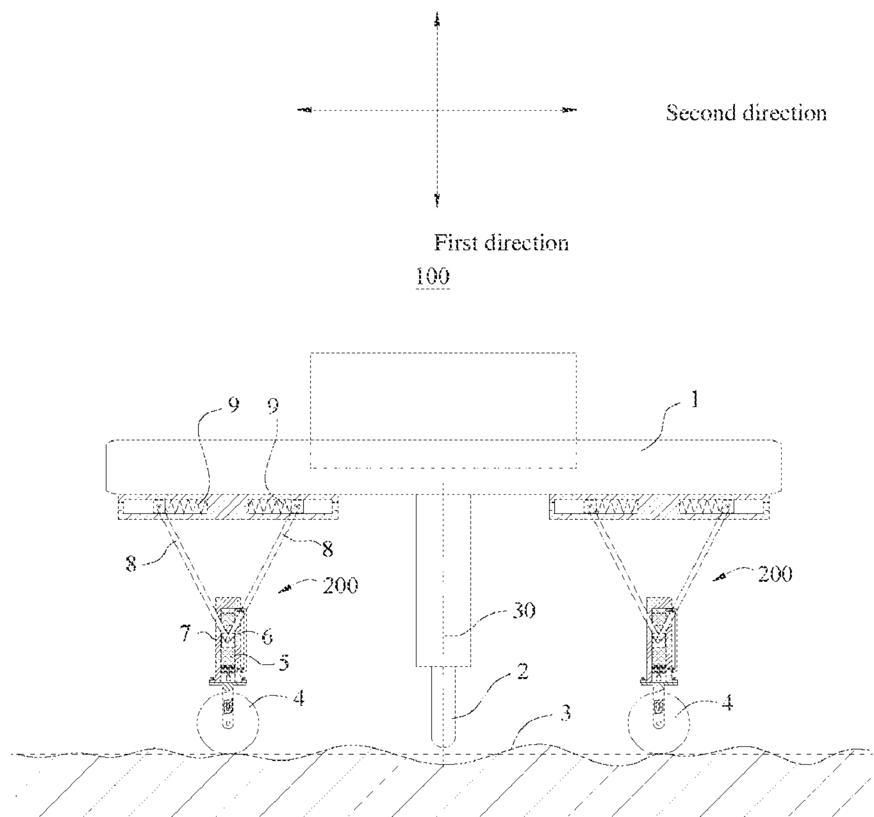
FIG. 1 is a schematic structural diagram of a mobile platform system according to an example of the present invention.

As shown in FIG. 1, a mobile platform system 100 comprises a mobile platform 1, and an adaptive damping nonlinear spring-variable damping system 200 arranged on the mobile platform 1.

The mobile platform 1 can be provided with a detection probe 2 to form a mobile detection platform; the detection probe 2 can be various suitable detection probes 2, such as an ultrasonic detection probe or a power detection probe, so correspondingly the mobile platform 1 is an ultrasonic mobile detection platform or a power mobile detection platform. In some examples, the mobile platform 1 may also be a vehicle. The mobile platform 1 may be provided with one or more rollers 4 for movement, by means of which the mobile platform 1 is moved on the ground or structure surface 3.

The mobile platform 1 may be provided with one or more (e.g. two) nonlinear spring-variable damping systems 200. The nonlinear spring-variable damping system 200 can be set according to the number of the corresponding rollers 4. For example, if the mobile platform 1 has two rollers 4, two nonlinear spring-variable damping systems 200 can be provided correspondingly. In some examples, the detection probe 2 can be arranged in the middle of the mobile platform 1; in the initial state (i.e., the mobile platform 1 is not vibrated on a horizontal plane), the two nonlinear spring-variable damping systems 200 may be symmetrical about the central axis 30 of the detection probe 2.

Figure 2:
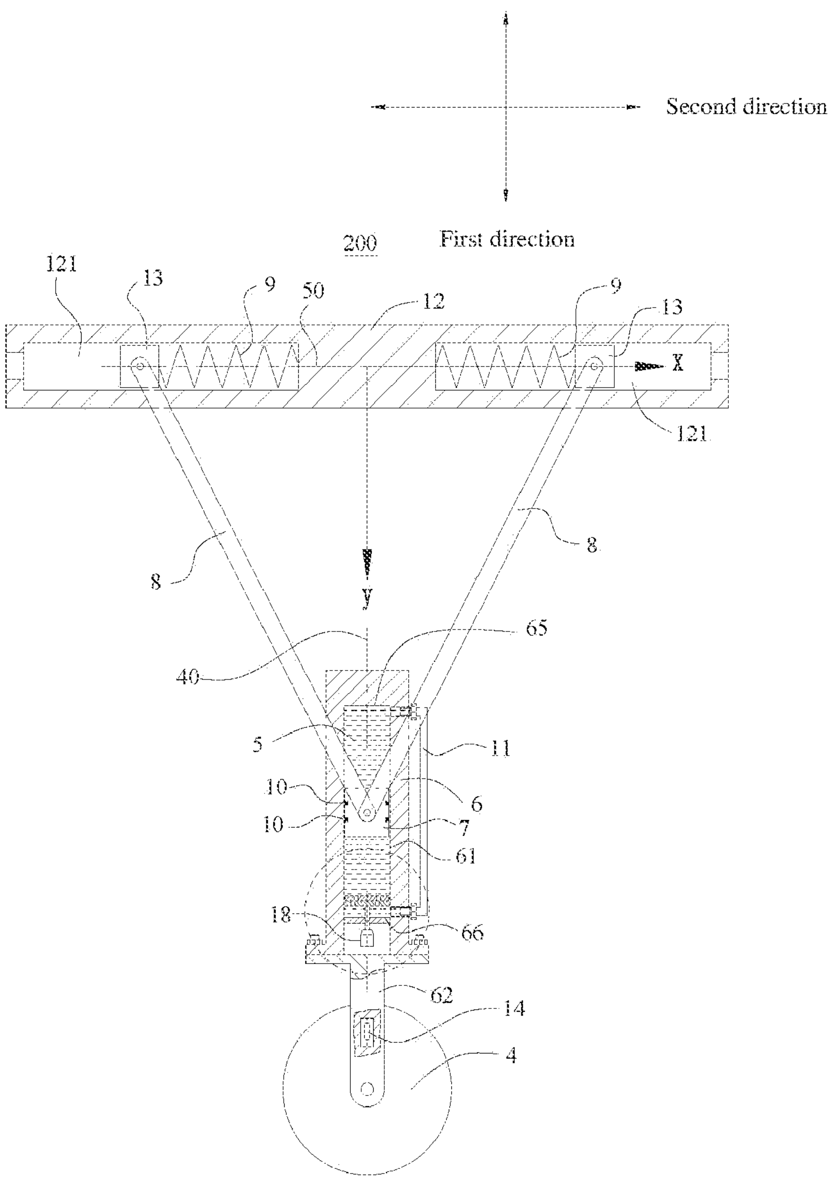
FIG. 2 is a schematic structural diagram of a nonlinear spring-variable damping system according to an example of the present invention.
Figure 8:
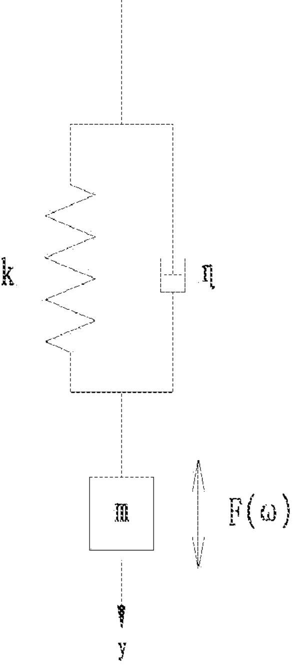
FIG. 8 is a schematic diagram of the principle of the nonlinear spring-variable damping system.

As shown in FIGS. 1 and 2, the nonlinear spring-variable damping system 200 comprises an oil cylinder 6 containing damping oil 5, a piston 7 accommodated in the oil cylinder 6, a connecting rod 8 connected to the piston 7, a spring 9 constrained by the connecting rod 8, and a damping adaptive adjusting device 300 for adjusting the system damping. Wherein, the damping adaptive adjustment device 300 is configured to be able to adaptively change the flow resistance of the damping oil 5 according to the vibration of the mobile platform 1, so as to perform negative feedback closed-loop control on the system damping. When the mobile platform 1 vibrates, the connecting rod 8 and the spring 9 can subject the piston 7 to a nonlinear spring force. As shown in FIG. 8, the system is equivalent to be subjected to the dual action of the equivalent nonlinear spring k and the variable damper η. The system damping refers to the damping received by the mobile platform during the vibration, that is, the damping received by the piston 7 during the movement. The magnitude of the system damping can be measured by a damping ratio, which is the ratio of the damping coefficient to the critical damping coefficient.

Figure 3:
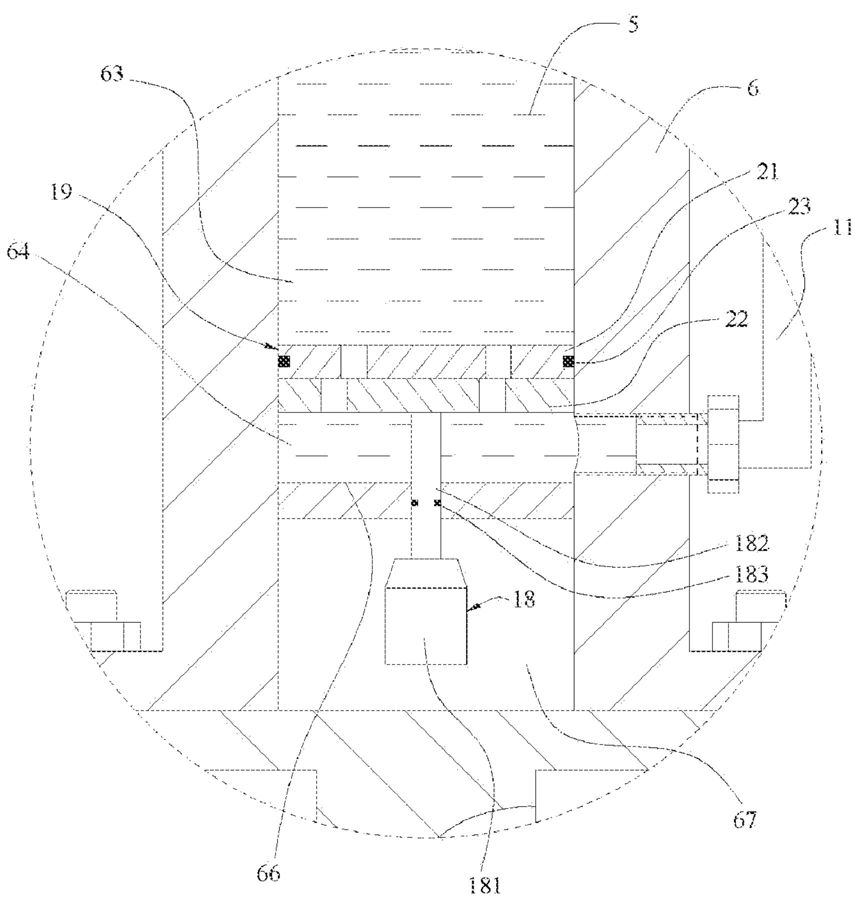
FIG. 3 is a partially enlarged view of FIG. 2.

As shown in FIGS. 2 and 3, the oil cylinder 6 extends in the first direction and has a cavity 61 extending in the first direction. For example, the first direction may be a vertical direction. The damping oil 5 and the piston 7 are accommodated in the cavity 61. The damping oil 5 may be any suitable damping oil available. The oil cylinder 6 is provided outside with an oil tube 11 communicating with the cavity 61. One end of the oil tube 11 communicates with the lower portion of the cavity 61, and the other end communicates with the upper portion of the cavity 61. The damping oil 5 can flow out of the cavity 61 to the oil tube 11, and flow back again into the cavity 61 from the oil tube 11. The oil cylinder 6 can also include a leg 62, through which it can be mounted on the roller 4.

The piston 7 is disposed in the oil cylinder 6 along the first direction and can move along the cavity 61 in the first direction. When the piston 7 moves along the oil cylinder 6, the damping oil 5 will flow; the damping oil 5, when flowing, can be discharged from the cavity 61 into one end of the oil tube 11, and then re-enter the cavity 61 from the other end of the oil tube 11, thereby realizing the circulating flow of the damping oil 5. A first sealing ring 10 may be provided between the piston 7 and the oil cylinder 6 to achieve sealing therebetween.

The nonlinear spring-variable damping system 200 may include a spring cylinder 12. The spring cylinder 12, fixed to the mobile platform 1, extends in the second direction and has an accommodation cavity 121 extending in the second direction. The first direction may be perpendicular to the second direction; for example, when the first direction is a vertical direction, the second direction may be a horizontal direction. The accommodation cavity 121 is provided with a spring 9 arranged in the second direction, and a slider 13 movable in the second direction along the accommodation cavity 121. The slider 13, whose movement is basically affected by the vibration of the mobile platform 1, may move outward or inward according to different vibration conditions. One end of the spring 9 is connected to the slider 13, and the other end is fixed to the spring cylinder 12. When the slider 13 moves horizontally, the spring 9 will be driven by the slider 13 to complete the deformation process. For example, the spring 9 will be elongated when the slider 13 moves horizontally outward, and shortened when the slider 13 moves horizontally inward. That is, the deformation process of the spring 9 is constrained by the connecting rod 8.

One end of the connecting rod 8 is connected to the slider 13, and the other end to the piston 7. The connecting rod 8 can be movably connected, e.g. hinged, with the slider 13 and the piston 7, respectively. The connecting rod 8 may be rigid, or substantially rigid. When the slider 13 moves, it can drive the connecting rod 8 to move synchronously, thus driving the piston 7 to move up and down. For example, the slider 13, when moving outward, can drive the connecting rod 8 to move outward, thereby driving the piston 7 to move upward, so that the damping oil 5 flows out of the top of the oil cylinder 6 to the oil tube 11 and flows back from the bottom of the oil cylinder 6; the slider 13, when moving inward, can drive the connecting rod 8 to move inward, thereby driving the piston 7 to move downward, so that the damping oil 5 flows out of the bottom of the oil cylinder 6 to the oil tube 11 and flows back from the top of the oil cylinder 6. In this process, the energy of the vibration is attenuated, thus achieving the damping purpose.

The elongation of the spring 9 and the displacement of the piston 7 satisfy the following constraint:

$$(x_0+u_x)^2+(y_0+u_y)^2=l^2$$

wherein a coordinate system (o, x, y) is defined, in which the origin is the intersection of the central axis 40 of the piston 7 and the central axis 50 of the slider 13, $x_0$ is the coordinate value of the slider 13 in its initial equilibrium position, $y_0$ is the coordinate value of the piston 7 in its initial equilibrium position, $u_x$ is the displacement of the slider 13 relative to its initial equilibrium position (i.e. the elongation of the spring 9), $u_y$ is the displacement of the piston 7 relative to its initial equilibrium position, and l is the length of the connecting rod 8.

It can be seen that the above constraint is essentially of the Pythagorean theorem.

According to the above constraint, the magnitude of the spring force applied by the spring 9 to the piston 7 through the connecting rod 8 in the first direction satisfies the following formula:

$$F_y=2k_xu_x(u_y+y_0)/(u_x+x_0)$$

The above formula can be Taylor expanded to obtain the spring force in the first direction, with the magnitude of the spring force satisfying the following formula:

$$k_yu_y\left[1+\beta_0u_y+\beta_1u_y^2\right]$$

where $$k_y=2k_xy_0^2/x_0^2,\ \beta_0=2l^2/y_0x_0^2\ \text{and}\ \beta_1=\left(3y_0^2+l^2\right)l^2/y_0^2x_0^4,$$

and $k_x$ is the spring coefficient of the spring 7.

Figure 4:
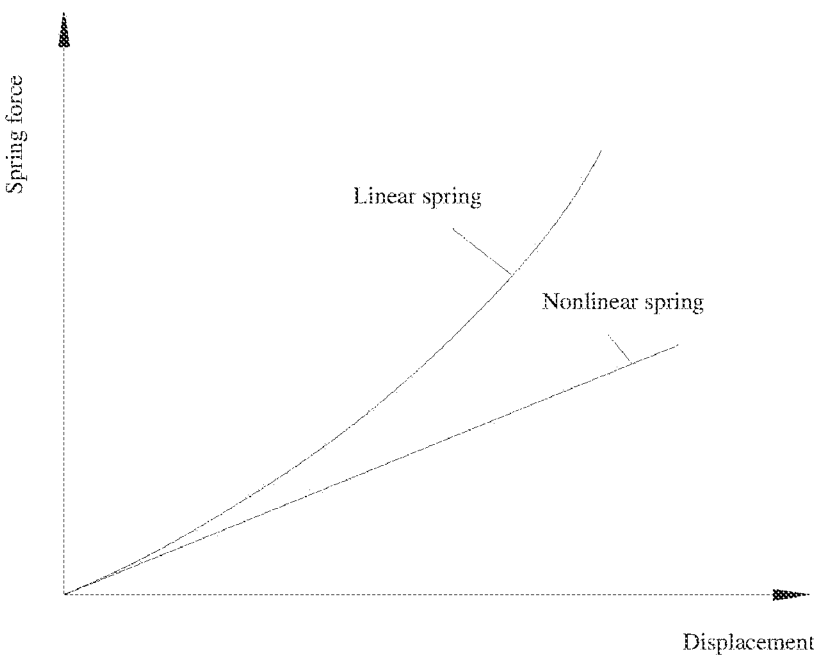
FIG. 4 is a schematic diagram of the relationship between the spring force and displacement of a linear spring and a nonlinear spring.

Therefore, it can be seen that the spring force received by the piston 7 in the first direction is a nonlinear spring force, which is equivalent to that the piston 7 is connected to a nonlinear spring k in the first direction. As shown in FIG. 4, the magnitude of the nonlinear spring force, compared with the linear spring force, is not linearly related to the displacement of the spring 9. Since the vibration of the mobile platform 1 is basically in the first direction, the nonlinear spring force received by the piston 7 in the first direction can form a corresponding relationship with the vibration of the mobile platform 1 in the first direction. Since the piston 7 is subjected to a nonlinear spring force, the damping effect is better than that when the piston 7 is subjected to a linear spring force, which enables the mobile platform 1 to better adapt to different structural surfaces 3 and usage conditions.

In some examples, as shown in FIG. 2, the spring cylinder 12 has two accommodation cavities 121 extending in the second direction, each of the accommodation cavities accommodating one spring 9 and one slider 13 connected to the spring 9; each of the sliders 13 is connected to one connecting rod 8, with the two connecting rods 8 connected to the piston 7 at the same time; when the two sliders 13 are in the initial equilibrium position, both the two sliders 13 and the two connecting rods 8 are symmetrical about the central axis of the piston 7; the connecting rods 8 at the left and right sides of the piston 7 jointly apply a nonlinear spring force to the piston 7, thereby achieving a better damping effect.

Figure 5:
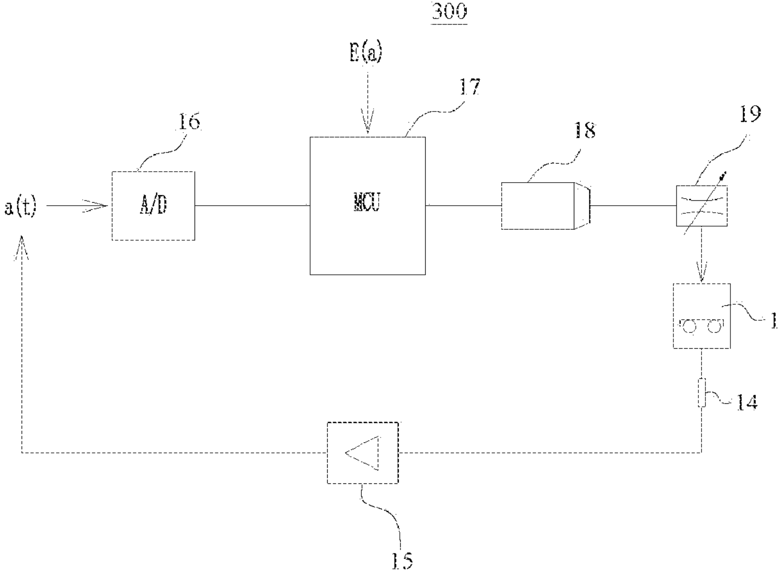
FIG. 5 is a schematic diagram of the principle of a damping adaptive adjustment device according to an example of the present invention.

As shown in FIG. 5, the damping adaptive adjustment device 300 comprises a power sensor 14, a charge amplifier 15 connected in communication with the power sensor 14, an analog-to-digital converter 16 connected in communication with the charge amplifier 15, a micro-control unit 17 connected in communication with the analog-to-digital converter 16, a drive member 18 connected in communication with the micro-control unit 17, and a variable damping adjuster 19 connected in communication with the drive member 18.

The power sensor 14, used to detect the vibration of the mobile platform 1, may be mounted close to the roller 4, e.g. mounted on the leg 62.

The power sensor 14 can convert a specific amount of mechanics generated by the mobile platform 1 into a small amount of electric charge, with the output impedance extremely high; through the adaptation to the charge amplifier 15, the small amount of electric charge can be converted into a voltage proportional to itself, with the high output impedance converted into a low output impedance.

The analog-to-digital converter (A/D converter) 16 receives an amplified signal from the charge amplifier 15, and converts the analog signal into a digital signal.

Through the charge amplifier 15 and the analog-to-digital converter 16, the micro-control unit 17 (MCU) can establish a communication connection with the power sensor 14 to receive the vibration information of the mobile platform 1 from the power sensor 14. The micro-control unit 17 is configured to be able to control the drive member 18 according to a predetermined control target based on the vibration information, so that the variable damping adjuster 19 can change the circulating flow resistance of the damping oil 5 under the action of the drive member 18. The predetermined control target can be set as the vibration acceleration or displacement amplitude of the mobile platform 1.

The variable damping adjuster 19 has at least one damping hole 20, through which the damping oil 5 flows in circulation; the damping hole 20, having a fully open position and a fully closed position, is configured to be switchable between the fully open position and the fully closed position under the action of the drive member 18.

As shown in FIGS. 3, 6*a*-6*h* and 7*a*-7*c*, the variable damping adjuster 19 comprises a first damping disc 21 and a second damping disc 22 that are stacked up and down; the first damping disc 21 is fixed relative to the oil cylinder 6; the second damping disc 22 is connected to the drive member 18, and can be driven by the drive member 18 to rotate relative to the first damping disc 21; the first damping disc 21 has at least one first hole 211, and the second damping disc 22 has at least one second hole 221 corresponding to the first hole 211, the first hole 211 and the second hole 221 composing the damping holes 20; both the first damping disc 21 and the second damping disc 22 are cylindrical, and have the same cross-sectional size; in addition, the first damping disc 21 and the second damping disc 22 are adapted to the shape of the cavity 61, so as to ensure that they can be in close contact with the inner wall of the cavity 61 along the circumferential direction, thereby ensuring that the damping oil 5 can basically only flow across the first damping disc 21 and the second damping disc 22 from the position of the damping hole 20; a second sealing ring 23 may also be arranged between the first damping disc 21 and the oil cylinder 6 to further ensure the sealing effect.

In some examples, the first damping disc 21 has four first holes 211 evenly arranged along the circumferential direction, and the second damping disc 22 has four second holes 221 evenly arranged along the circumferential direction, with an angle of 90° formed between two adjacent first holes 211 and between two adjacent second holes 221. The size and shape of the first holes 211 and the second holes 221 can be set according to actual needs.

In some examples, the first hole 211 and the second hole 221 are both slot-shaped, with their cross-sectional shapes exactly the same; and the positions of the first hole 211 and the second hole 221 respectively relative to the centers of the first damping disc 21 and the second damping disc 22 can be exactly the same.

Figures 6A, 6B, 6C, 6D, 6E, 6F, 6G, 6H:
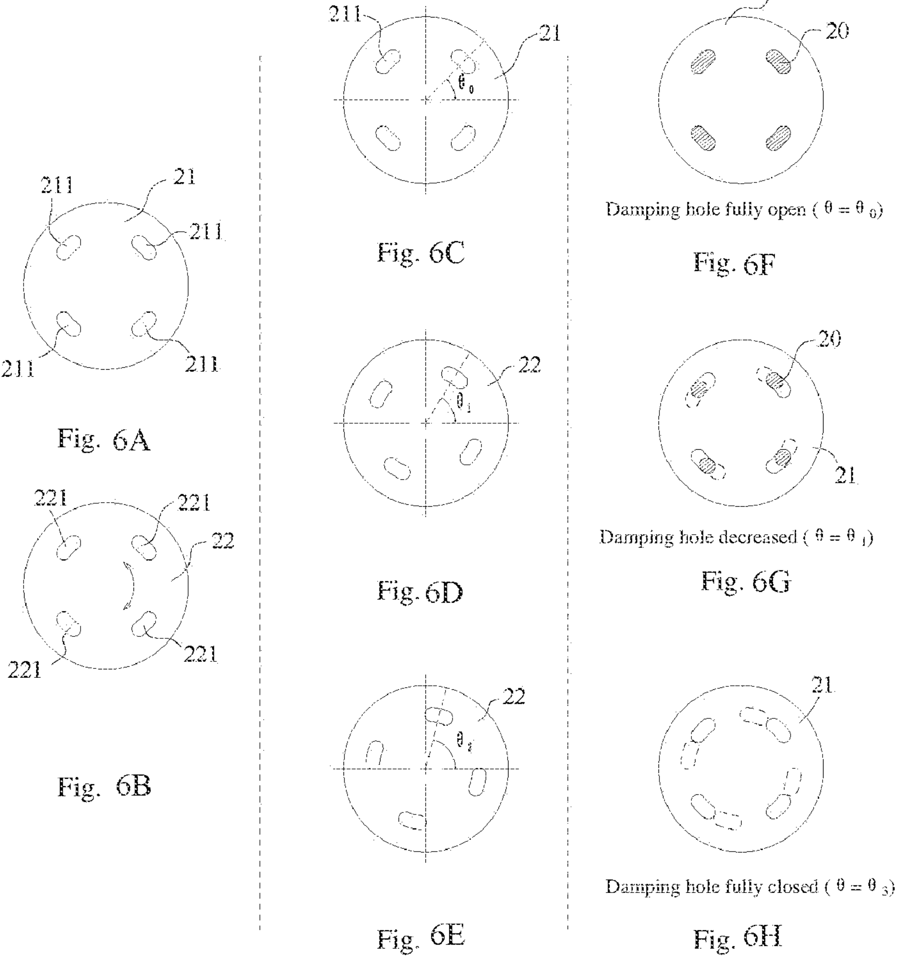
FIGS. 6A-H show various views of the damping disc.

Please refer to FIGS. 6*c*-6*e*, in which $\theta_0$ represents the current angle of the first damping disc 21, and $\theta_1$ and $\theta_2$ represent the angles of the second damping disc 22.

Figure 7A:
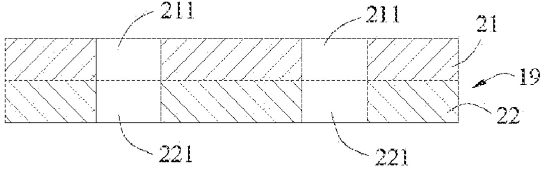
FIGS. 7A-C show various sectional views of a variable damping adjuster.

As shown in FIGS. 6*f* and 7*a*, when the positions of the first hole 211 and the second hole 221 are completely aligned in the circumferential direction, that is, when the current angle $\theta$ of the second damping disc 22 satisfies $\theta=\theta_0$, the size of the damping hole 20 is equal to the size of the first hole 211 and also equal to the size of the second hole 221, with the damping hole 20 in the fully open position at this time.

Figure 7B:
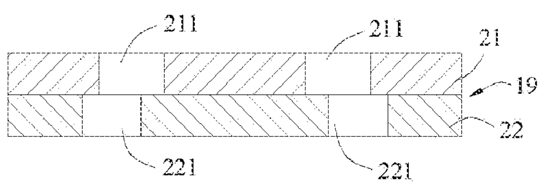
Figure 7C:
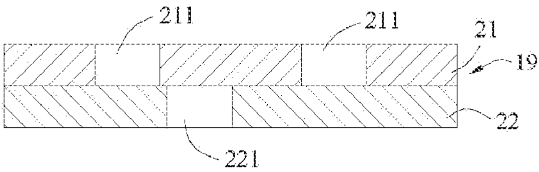

As shown in FIGS. 6*h* and 7*c*, when the positions of the first hole 211 and the second hole 221 are completely misaligned, the current angle $\theta$ of the second damping disc 22 satisfies $\theta=\theta_2$, that is, the positions of the first hole 211 and the second hole 221 are completely misaligned in the circumferential direction, with the damping hole 20 no longer appearing at this time, i.e. the damping hole 20 being in a completely closed position.

As shown in FIGS. 6*g* and 7*b*, when the first hole 211 and the second hole 221 partially overlap in the circumferential direction, the current angle $\theta$ of the second damping disc 22 satisfies $\theta=\theta_1$ at this time, with the size of the damping hole 20 equivalent to the size of the overlapping portion of the first hole 211 and the second hole 221. In addition, in order to ensure that the damping hole 20 can be in the fully closed position, the circumferential length of the first hole 211 and the second hole 221 cannot be too long, so as to ensure that the first hole 211 and the second hole 221 can be completely misaligned without any overlapping portions.

Since the drive member 18 can drive the second damping disc 22 to rotate relative to the first damping disc 21, the rotation angle of the second damping disc 22 can be changed by controlling and changing the rotation angle of the drive member 18, thereby changing the angle of the second hole 221; in this way, the circumferential position of the second hole 221 relative to the first hole 211 is changed, so that the damping hole 20 can be switched between the fully open position and the fully closed position. When the size of the damping hole 20 changes, the flow resistance of the damping oil 5 also changes correspondingly. Specifically, the larger the damping hole 20, the smaller the flow resistance of the damping oil 5 and the smaller the system damping; while the smaller the damping hole 20, the greater the flow resistance of the damping oil 5 and the greater the system damping. Since the damping hole 20 can be adjusted between the fully open position and the fully closed position, a wide range of adaptive adjustment of the system damping can be achieved, so that the mobile platform 1 can adapt to many different structural surfaces 3 and achieve a good damping effect.

The drive member 18 may be any suitable drive member and, according to different examples, may be a motor, a cylinder, or the like. For example, the motor may be a stepping motor and the cylinder may be a rotary cylinder.

As shown in FIGS. 2 and 3, the cavity 61 of the oil cylinder 6 may include a first space 63 and a second space 64, which communicate with each other through the damping hole 20; the oil cylinder 6 is provided at the top with a first wall 65 and at the bottom with a second wall 66, for defining the cavity 61; the first space 63 is defined between the first wall 65 and the first damping disc 21, and the second space 64 is defined between the second wall 66 and the second damping disc 22; the body 181 of the drive member 18 is mounted on the outer side of the second wall 66, and the drive portion 182 of the drive member 18 penetrates the second wall 66 into the second space 64 to be connected to the second damping disc 22; a third sealing ring 183 for sealing is provided between the drive portion 182 and the second wall 66; the oil cylinder 6 can also form, between the leg 62 and the second wall 66, an accommodation space 67, in which the body 181 of the drive member 18 can be accommodated, so as to achieve a compact structure and reduce the occupation of space.

In some examples, the drive member 18 is a stepping motor. The micro-control unit 17 controls the drive member 18 according to a predetermined control target, thereby controlling the system damping. For example, when the mobile platform 1 vibrates, the power sensor 14 collects corresponding data, and sends the data to the micro-control unit 17; the micro-control unit 17 compares the data with the predetermined control target, and sends a pulse to the stepping motor if the actual control target is found to exceed the predetermined control target; and the stepping motor drives the second damping disc 22 to rotate to reduce the damping hole 20, thereby increasing the system damping, so that the resistance received by the piston 7 in motion is increased, thus suppressing the vibration of the mobile platform 1. That is, the micro-control unit 17 can adaptively adjust the damping by performing negative feedback closed-loop control on the system damping, there realizing the adaptive damping of the mobile detection platform.

In one aspect, the nonlinear spring-variable damping system 200 makes the piston 7 receive a nonlinear spring force in the first direction, so that a good corresponding relationship is formed between the force on the piston 7 and the vibration of the mobile platform 1; in the other aspect, the system can adaptively change the flow resistance of the damping oil 5 according to the vibration of the mobile platform 1, so as to perform the negative feedback closed-loop control on the system damping. Due to both the aspects, the system can become a good equivalent damping system for the vertical vibration of the mobile platform 1.

Figure 9:
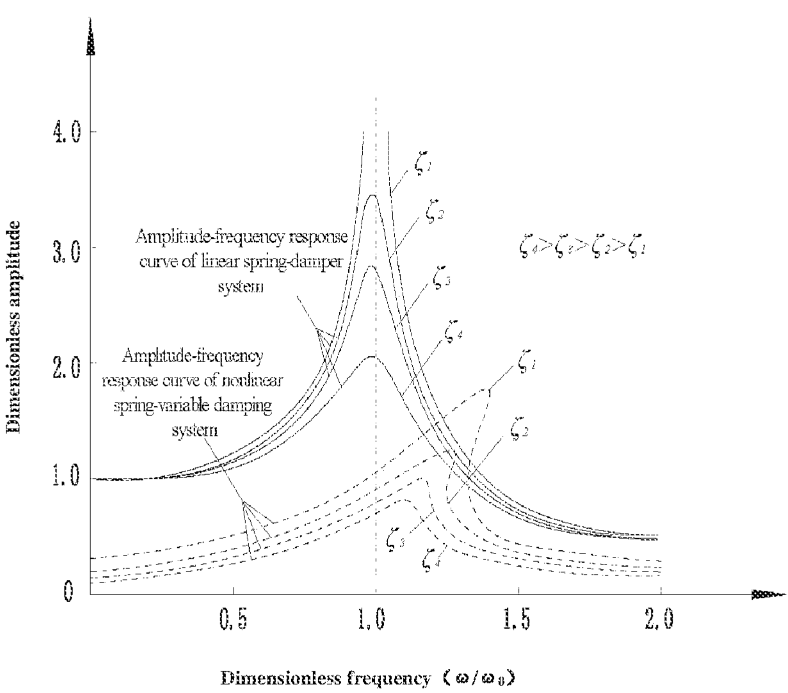
FIG. 9 is a schematic diagram of an amplitude-frequency response curve of the linear spring-damping system and the nonlinear spring-variable damping system.

As shown in FIG. 9, $\omega$ is the excitation frequency of the system, $\omega_0$ is the natural frequency of the system, and $\zeta_i$ is the damping ratio (the ratio of the damping coefficient to the critical damping coefficient). As can be seen, the amplitude of the nonlinear spring-variable damping system 200, compared with the linear spring-damping system, is greatly suppressed; and when the system damping is adaptively adjusted to a value greater than a certain value (for example, the damping ratio is greater than $\zeta_3$), the amplitude-frequency response curve of the system is very smooth, indicating that a good adaptive damping effect is achieved.

Figure 10:
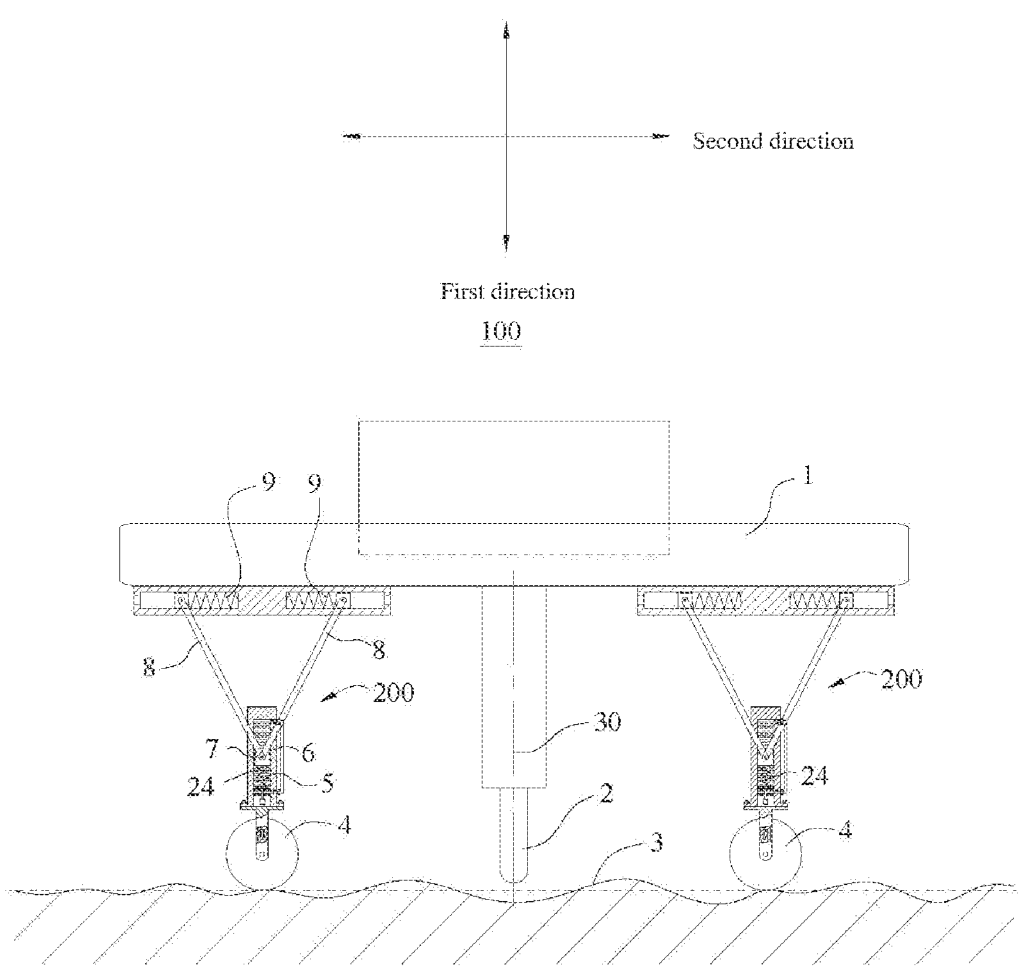
FIG. 10 is a schematic structural diagram of a mobile platform system according to another example of the present invention.
Figure 11:
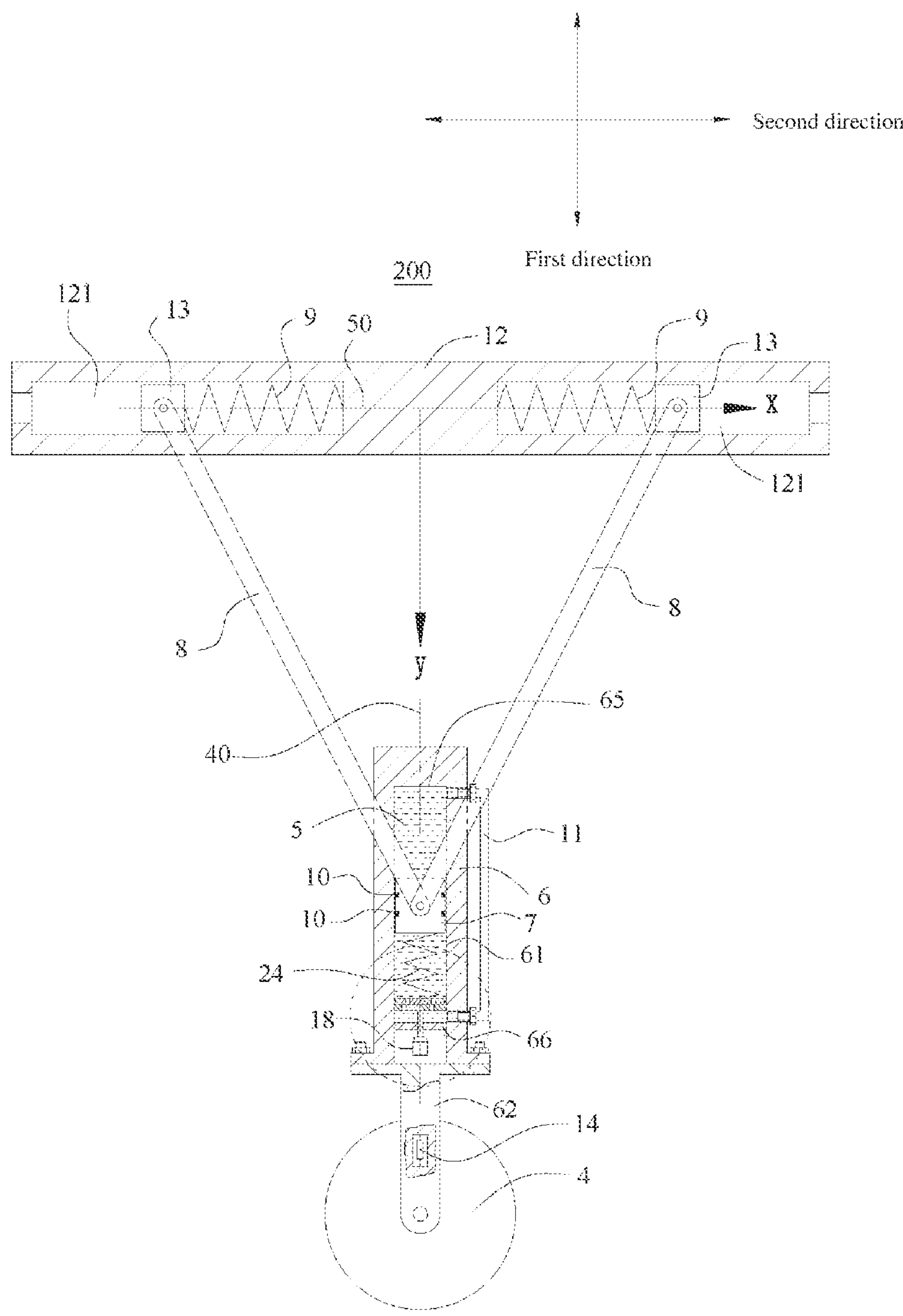
FIG. 11 is a schematic structural diagram of a nonlinear spring-variable damping system according to another example of the present invention.
Figure 12:
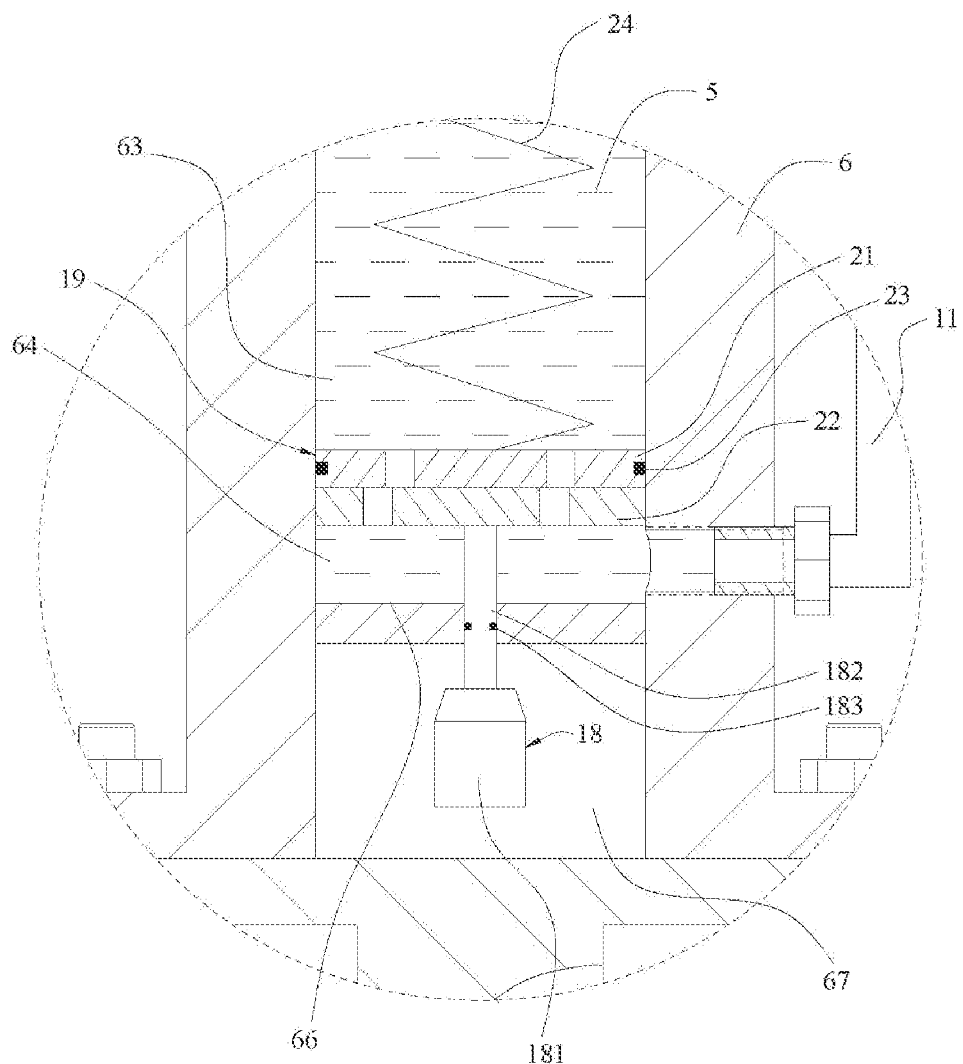
FIG. 12 is a partially enlarged view of FIG. 11.

In some examples, as shown in FIGS. 10-12, the nonlinear spring-variable damping system 200 of the mobile platform system of the present invention may further include a spring 24 disposed in the oil cylinder along the first direction. In this example, in addition to the spring 24, the other structures of the mobile platform system, including the nonlinear spring-variable damping system 200, may have the same configuration as those disclosed herein above. In FIGS. 10-12, for example, the same numerals represent the same structures as above, so these structures will not be described again.

One end of the spring 24 is fixed in the oil cylinder 6 (e.g. the end can be fixed on the top end of the first damping disc located in the oil cylinder 6), and the other end of the spring 24 is fixedly connected to the bottom end of the piston 7. With such a configuration, the connecting rod 8, the spring 9 and the spring 24 can subject the piston 7 to a nonlinear spring force.

As described above, the elongation of the spring 9 and the displacement of the piston 7 satisfy the following constraint:

$$(x_0+u_x)^2+(y_0+u_y)^2=l^2$$

The spring 9 can apply a first spring force to the piston 7 in the first direction through the connecting rod 8:

$$F_{y1}=2k_xu_x(u_y+y_0)/(u_x+x_0)$$

where $k_x$ is the spring coefficient of the first spring;

the spring 24 can apply a second spring force to the piston 7 in the first direction:

$$F_{y2}=k_yu_y$$

where $k_y$ is the spring coefficient of the second spring;

thereby the resultant force of the first spring force and the second spring force in the first direction can be obtained:

$$F_y=F_{y1}+F_{y2}=2k_xu_x(u_y+y_0)/(u_x+x_0)+k_yu_y$$

wherein the vertical resultant force $F_y$ is expressed as $$F_y=k\,u_y\left[1+\beta_0u_y+\beta_1u_y^2\right]$$

after Taylor expansion, where $$k=\left(x_0^2k_y+2y_0^2k_x\right)/x_0^2,$$

$$\beta_0=4y_0l^2k_x/\left(k_yx_0^2+2y_0^2k_x\right)x_0^2 \text{ and } \beta_1=2k_x\left(6y_0^2+l^2\right)l^2/\left(k_yx_0^2+2y_0^2k_x\right)x_0^4$$

are all constants, that is, it is equivalent to the piston 7 being connected with the nonlinear spring; likewise, in this example, the nonlinear spring-variable damping system has a schematic diagram of the principle still as shown in FIG. 8, and also has a schematic diagram of the amplitude-frequency curve similar to that shown in FIG. 9.

The above detailed description is only the description of the preferred examples of the present invention, and is not intended to limit the patent scope of the present invention. Therefore, all equivalent technical changes made based on the content of the present invention are included in the patent scope of the present invention.

We claim:

1. An adaptive damping nonlinear spring-variable damping system, applied to a mobile platform, characterized in that the system comprises the following components:

an oil cylinder accommodating damping oil;

a piston, accommodated in the oil cylinder and movable in a first direction along the oil cylinder to make the damping oil flow;

at least one connecting rod, connected to the piston;

at least one first spring, arranged in a spring cylinder along a second direction perpendicular to the first direction, the spring cylinder being fixed to the mobile platform and further provided inside with at least one slider that can move in the second direction along the spring cylinder, the first spring having one end connected to the slider and the other end fixed to the spring cylinder, the connecting rod having one end connected to the slider and the other end connected to the piston; and a damping adaptive adjustment device, configured to be able to adaptively change the flow resistance of the damping oil according to the vibration of the mobile platform, so as to control system damping;

wherein, when the mobile platform vibrates, the connecting rod and the first spring are capable of subjecting the piston to a nonlinear spring force.

2. The adaptive damping nonlinear spring-variable damping system according to claim 1, characterized in that: the elongation of the first spring and the displacement of the piston satisfy the following constraint:

$$(x_0+u_x)^2+(y_0+u_y)^2=l^2$$

wherein a coordinate system (o, x, y) is defined, in which the origin is the intersection of the central axis of the piston and the central axis of the slider, $x_0$ is the coordinate value of the slider in its initial equilibrium position, $y_0$ is the coordinate value of the piston in its initial equilibrium position, $u_x$ is the displacement of the slider relative to its initial equilibrium position (i.e. the elongation of the first spring), $u_y$ is the displacement of the piston relative to its initial equilibrium position, and l is the length of the connecting rod.

3. The adaptive damping nonlinear spring-variable damping system according to claim 2, characterized in that:

the magnitude of the nonlinear spring force in the first direction satisfies the following formula:

$$k_y u_y\left[1+\beta_0 u_y+\beta_1 u_y^2\right]$$

where $$k_y = 2k_x y_0^2 / x_0^2,\ \beta_0 = 2l^2 / y_0 x_0^2 \text{ and } \beta_1 = (3y_0^2 + l^2)l^2 / y_0^2 x_0^4,$$

and $k_x$ is the spring coefficient of the spring.

4. The adaptive damping nonlinear spring-variable damping system according to claim 2, characterized in that: it further comprises a second spring arranged in the oil cylinder along the first direction, the second spring having one end fixed in the oil cylinder and the other end connected to the piston;

wherein the first spring can apply a first spring force to the piston in the first direction through the connecting rod:

$$F_{y1} = 2k_x u_x (u_y + y_0) / (u_x + x_0)$$

where $k_x$ is the spring coefficient of the first spring;

the second spring can apply a second spring force to the piston in the first direction:

$$F_{y2} = k_y u_y$$

where $k_y$ is the spring coefficient of the second spring; and the resultant force of the first and second spring forces in the first direction is as follows:

$$F_y = F_{y1} + F_{y2} = 2k_x u_x (u_y + y_0) / (u_x + x_0) + k_y u_y$$

wherein the vertical resultant force $F_y$ is expressed as $$F_y = k u_y\left[1+\beta_0 u_y+\beta_1 u_y^2\right]$$

after Taylor expansion, where $$k = (x_0^2 k_y + 2y_0^2 k_x)/x_0^2,\ \beta_0 = 4y_0 l^2 k_x/(k_y x_0^2 + 2y_0^2 k_x)x_0^2,$$
$$\text{and } \beta_1 = 2k_x(6y_0^2 + l^2)l^2/(k_y x_0^2 + 2y_0^2 k_x)x_0^4.$$

5. The adaptive damping nonlinear spring-variable damping system according to claim 1, characterized in that: the spring cylinder has two accommodation cavities extending in the second direction, each of the accommodation cavities accommodating one of the first springs and one of the sliders connected to the first spring; and each of the sliders is connected to one of the connecting rods, with the two connecting rods connected to the piston at the same time;

wherein, when the two sliders are in the initial equilibrium position, both the two sliders and the two connecting rods are symmetrical about the central axis of the piston.

6. The adaptive damping nonlinear spring-variable damping system according to claim 1, characterized in that the damping adaptive adjustment device comprises the following components:

a power sensor for detecting the vibration of the mobile platform;

a micro-control unit, connected in communication with the power sensor to receive vibration information of the mobile platform from the power sensor;

a drive member, connected in communication with the micro-control unit; and a variable damping adjuster, arranged in the oil cylinder and connected to the drive member;

wherein the micro-control unit is configured to be able to control the drive member according to a predetermined control target based on the vibration information, so that the variable damping adjuster can change the circulating flow resistance of the damping oil under the action of the drive member.

7. The adaptive damping nonlinear spring-variable damping system according to claim 5, characterized in that: the variable damping adjuster has at least one damping hole, through which the damping oil flows in circulation; the damping hole, having a fully open position and a fully closed position, is configured to be switchable between the fully open position and the fully closed position under the action of the drive member.

8. The adaptive damping nonlinear spring-variable damping system according to claim 7, characterized in that: the variable damping adjuster comprises a first damping disc and a second damping disc that are stacked together, the second damping disc being connected to the drive member and able to be driven by the drive member to rotate relative to the first damping disc; and the first damping disc has at least one first hole, and the second damping disc has at least one second hole corresponding to the first hole, the first and second holes composing the damping holes;

wherein the drive member can change the rotation angle of the second damping disc, thereby changing the angle of the second hole, so that the damping hole can be switched between the fully open position and the fully closed position.

9. The adaptive damping nonlinear spring-variable damping system according to claim 8, characterized in that: it further comprises a second spring arranged in the oil cylinder along the first direction, the second spring having one end fixed to the first damping disc and the other end fixed to the piston, wherein the connecting rod and the first and second springs are capable of subjecting the piston to a nonlinear spring force.

10. The adaptive damping nonlinear spring-variable damping system according to claim 6, characterized in that the damping adaptive adjustment device further comprises the following components:

a charge amplifier, connected in communication with the power sensor; and an analog-to-digital converter, connected in communication with the charge amplifier for receiving an amplified signal from the charge amplifier.

11. The adaptive damping nonlinear spring-variable damping system according to claim 1, characterized in that: it further comprises a second spring arranged in the oil cylinder along the first direction, the second spring having one end fixed in the oil cylinder and the other end connected to the piston, wherein the connecting rod and the first and second springs are capable of subjecting the piston to a nonlinear spring force.

12. A mobile platform system, characterized in that the system comprises the following components:

a mobile platform; and the adaptive damping nonlinear spring-variable damping system according to claim 1, arranged on the mobile platform.

13. The mobile platform system according to claim 12, characterized in that: the mobile platform is provided with a detection probe.

14. The mobile platform system according to claim 12, characterized in that: the detection probe has a central axis extending in the first direction; and the mobile platform is provided with two nonlinear spring-variable damping systems, which are symmetrical about the central axis of the detection probe.

15. A mobile platform system, characterized in that: it comprises the following components:

a mobile platform; and an adaptive damping nonlinear spring-variable damping system arranged on the mobile platform; the nonlinear spring-variable damping system comprises the following components:

an oil cylinder accommodating damping oil;

a piston, accommodated in the oil cylinder and movable in the first direction along the oil cylinder to make the damping oil flow, having a central axis extending in the first direction;

at least one connecting rod, connected to the piston, a non-zero angle formed between the central axis of the connecting rod and the piston;

at least one first spring, arranged in a spring cylinder along a second direction perpendicular to the first direction, the spring cylinder being fixed to the mobile platform and further provided inside with at least one slider that can move in the second direction along the spring cylinder, the first spring having one end connected to the slider and the other end fixed to the spring cylinder, the connecting rod having one end connected to the slider and the other end connected to the piston;

a second spring arranged in the oil cylinder along the first direction, having one end fixed in the oil cylinder and the other end connected to the piston; and a damping adaptive adjustment device, configured to be able to adaptively change the flow resistance of the damping oil according to the vibration of the mobile platform, so as to control the system damping;

wherein the connecting rod and the first and second springs are capable of subjecting the piston to a nonlinear spring force.

* * * * *